United States Patent
Forsythe

(10) Patent No.: US 8,911,238 B2
(45) Date of Patent: Dec. 16, 2014

(54) PROSTATE BRACHYTHERAPY SIMULATOR

(71) Applicant: BrachyTech LLC, Eugene, OR (US)

(72) Inventor: Kevin Forsythe, Eugene, OR (US)

(73) Assignee: BrachyTech LLC, Eugene, OR (US)

( * ) Notice: Subject to any disclaimer, the term of this patent is extended or adjusted under 35 U.S.C. 154(b) by 109 days.

(21) Appl. No.: 13/685,624

(22) Filed: Nov. 26, 2012

(65) Prior Publication Data

US 2013/0137075 A1  May 30, 2013

Related U.S. Application Data

(60) Provisional application No. 61/563,832, filed on Nov. 28, 2011.

(51) Int. Cl.
 *G09B 23/28* (2006.01)
 *G09B 23/30* (2006.01)

(52) U.S. Cl.
 CPC ............... *G09B 23/28* (2013.01); *G09B 23/30* (2013.01)
 USPC ........................................................ 434/267

(58) Field of Classification Search
 USPC .......................... 434/262, 267, 268, 272, 273
 See application file for complete search history.

(56) References Cited

U.S. PATENT DOCUMENTS

| | | | |
|---|---|---|---|
| 4,277,367 A | 7/1981 | Madsen et al. | |
| 5,053,341 A | 10/1991 | Companion | |
| 5,055,051 A * | 10/1991 | Duncan | 434/262 |
| 5,061,187 A * | 10/1991 | Jerath | 434/262 |
| 5,071,602 A | 12/1991 | Nambu et al. | |
| 5,196,343 A | 3/1993 | Zerhouni et al. | |
| 5,625,137 A | 4/1997 | Madsen et al. | |
| 5,805,665 A | 9/1998 | Nelson et al. | |
| 5,902,748 A | 5/1999 | Madsen et al. | |
| 6,129,670 A | 10/2000 | Burdette et al. | |
| 6,190,915 B1 | 2/2001 | Madsen et al. | |
| 6,238,343 B1 | 5/2001 | Madsen et al. | |
| 6,336,812 B1 * | 1/2002 | Cooper et al. | 434/267 |
| 6,352,860 B1 | 3/2002 | Madsen et al. | |
| 6,474,993 B1 | 11/2002 | Grund et al. | |
| 6,505,065 B1 | 1/2003 | Yanof et al. | |
| 6,511,325 B1 * | 1/2003 | Lalka et al. | 434/272 |
| 6,610,013 B1 | 8/2003 | Fenster et al. | |
| 6,635,486 B2 | 10/2003 | D'Souza et al. | |
| 7,201,715 B2 | 4/2007 | Burdette et al. | |
| 7,255,565 B2 | 8/2007 | Keegan | |

(Continued)

OTHER PUBLICATIONS

Hungr et al., 'A Realistic Deformable Prostate Phantom for Multimodal Imaging and Needle-Insertion Procedures,' American Assoc. Phys. Med., vol. 39, No. 4, Apr. 2012.

(Continued)

*Primary Examiner* — Kurt Fernstrom
(74) *Attorney, Agent, or Firm* — Beyer Law Group LLP

(57) ABSTRACT

Methods for forming a prostate brachytherapy simulator are provided. A method comprises forming a molded rectum model between tubes secured to a base component of a container. The base component has a first open-bottomed cup that opens to an exterior of the container and a second cup that contains the first open-bottomed cup. The method also comprises forming a molded prostate model from recyclable materials. Additionally, the method comprises placing the prostate model relative to the rectum model. The method also comprises providing a gel-based environment that surrounds the rectum model and the prostate model within a container.

16 Claims, 13 Drawing Sheets

(56) References Cited

U.S. PATENT DOCUMENTS

| | | | |
|---|---|---|---|
| 7,419,376 | B2 | 9/2008 | Sarvazyan et al. |
| 7,462,488 | B2 | 12/2008 | Madsen et al. |
| 7,544,062 | B1* | 6/2009 | Hauschild et al. ............ 434/267 |
| 7,553,159 | B1* | 6/2009 | Arnal et al. .................... 434/267 |
| 7,677,897 | B2* | 3/2010 | Sakezles ........................ 434/267 |
| 7,845,949 | B2* | 12/2010 | Wilkins et al. ................. 434/268 |
| 7,907,699 | B2 | 3/2011 | Long et al. |
| 8,568,147 | B2* | 10/2013 | Kuo et al. ...................... 434/272 |
| 2007/0148626 | A1* | 6/2007 | Ikeda ............................. 434/272 |
| 2010/0041005 | A1* | 2/2010 | Campbell et al. ............. 434/267 |
| 2011/0091855 | A1* | 4/2011 | Miyazaki ....................... 434/267 |

OTHER PUBLICATIONS

Zhang et al., '*System for Fabrication of Custom Brachytherapy-Specific Prostate Phantoms*,' UCSF Dept. of Radiation Oncology, Poster Displayed: PO-359, World Congress of Brachytherapy Meeting, Barcelona, Spain. May 10-12, 2012. http://www.estro-events.org/Pages/WCB2012_SciProg.aspx.

Zhang et al., '*System for Fabrication of Custom Brachytherapy-Specific Prostate Phantoms*,' UCSF, Dept. of Radiation Oncology. Department Display Poster 2012.

\* cited by examiner

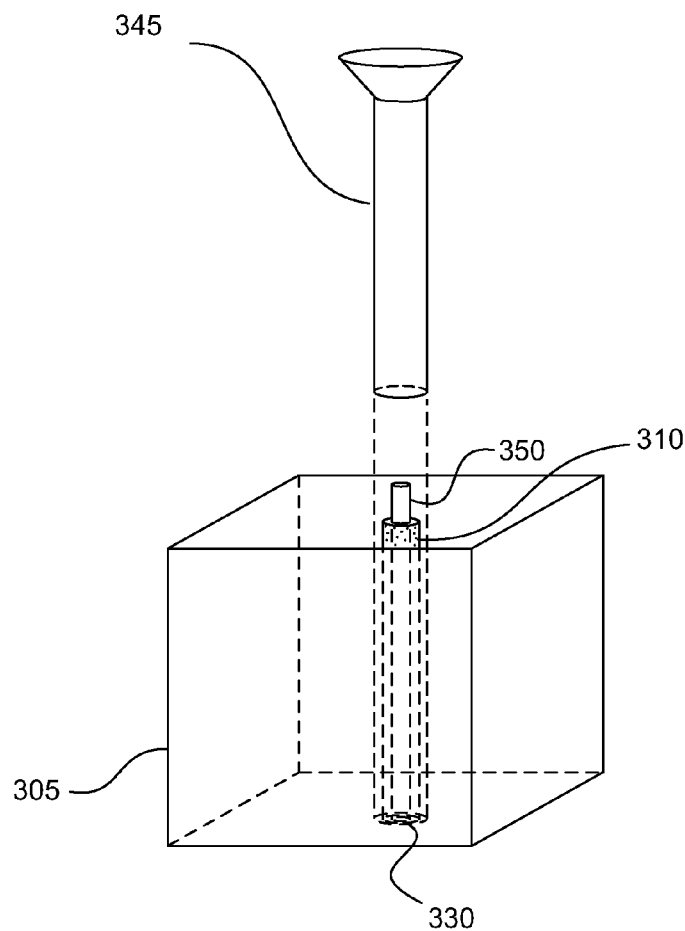
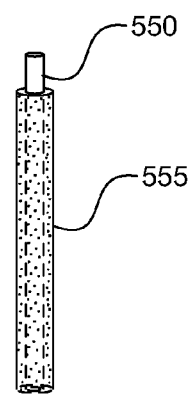
FIG. 4
FIG. 5

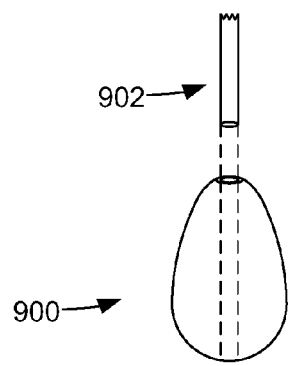 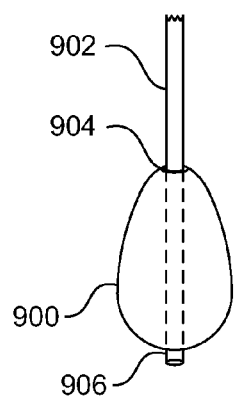 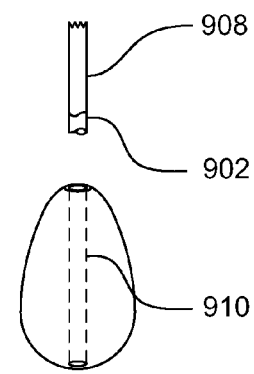
FIG. 9A   FIG. 9B   FIG. 9C
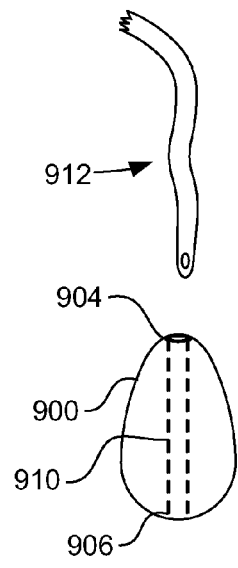 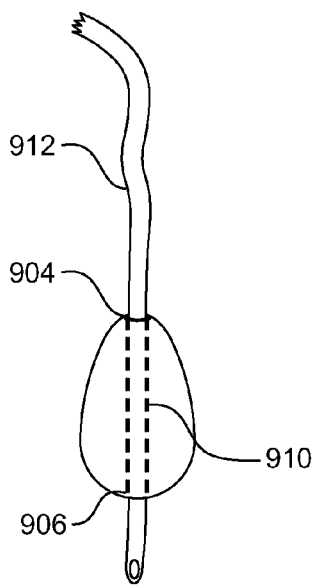 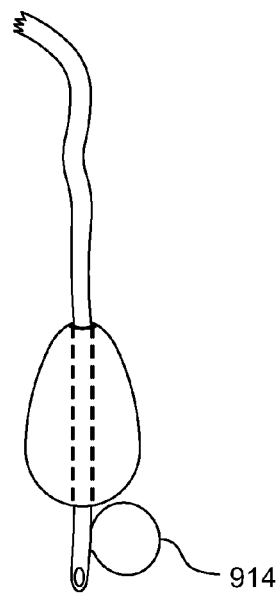
FIG. 9D   FIG. 9E   FIG. 9F

PROSTATE BRACHYTHERAPY SIMULATOR

CROSS REFERENCE TO RELATED APPLICATIONS

This application claims the benefit of priority under 35 USC 119 (e) to U.S. Provisional Patent Application No.: 61/563,832, filed on Nov. 28, 2011, entitled "METHOD AND APPARATUS FOR THE MAKING OF A PROSTATE BRACHYTHERAPY SIMULATOR."

FIELD OF THE INVENTION

The present invention relates to improvements that increase the efficiency of prostate brachytherapy training procedures. Prostate brachytherapy training simulators may be used to train users and/or machines that perform a prostate brachytherapy procedure. In particular, a reusable prostate brachytherapy simulator having recyclable components is provided.

BACKGROUND OF THE INVENTION

Prostate cancer is the most common form of cancer in men. More than 240,000 men in the U.S. are diagnosed with prostate cancer each year. One method of treating prostate cancer is brachytherapy, also referred to as "radioactive seed implantation." During this procedure, radioactive seeds are placed into a prostate through the use of needles. It is important to place the radioactive seeds in the correct locations. As such, the use of a simulator may facilitate the development of hand-eye coordination that is crucial to the brachytherapy procedure. A simulator may also provide a means for measuring performance and competency in a prostate brachytherapy surgical technique. In particular, a simulator may be used to train a user and/or a machine operated by a user that performs a prostate brachytherapy procedure.

The prostate brachytherapy procedure consists of implanting many small radioactive "seeds" directly into the prostate via needles inserted through the perineum. The procedure is typically done under local anesthesia and involves using a transrectal ultrasound (TRUS) probe to visualize the entire procedure in real time. After the patient is prepped and on the operating table with the TRUS probe in place, the physician inserts about 15-25 needles through the perineum. Each needle may be placed by hand while under continuous visualization by the TRUS to confirm the exact location of needle placement. Alternatively, each needle may be placed by a machine designed to perform the prostate brachytherapy procedure.

The brachytherapy needles may be evenly spaced throughout the entire prostate gland. Additionally, care is taken to avoid inserting needles into the urethra and/or the rectal wall. After the needles are in place, the physician uses an applicator device to insert the radioactive seeds. In particular, the physician may use a ramrod to slide the radioactive seeds down the bore of the needle until each seed exits the needle and embeds itself into a desired location within the prostate. After the first seed is placed, the needle may be withdrawn about one centimeter and another seed is deployed through the needle; this is repeated until the entire length of the prostate has been "seeded," after which the physician removes the needle. The physician then moves on to the next needle, implants more seeds in a line across the prostate in a manner described above, and repeats the seed implantation process for all of the remaining seeds. In this process, a total of 50-100 seeds may be implanted.

After all of the seeds are implanted, routine x-ray fluoroscopy or cystoscopy imaging studies are performed to verify the correct placement of the seeds and to rule out any accidental seed placement in the bladder. If a seed is seen in the bladder, it can be removed by a urologist using fiberoptic cystoscopy. The entire brachytherapy procedure can be completed in about 90 minutes, and the patient is discharged home after the anesthetic wears off. Most of the seeds' radioactivity is given off over the course of a few months, during which time the prostate cancer cells are sterilized by the radiation. Although the seeds become essentially inert after a few months, the seeds remain in the patient permanently.

It has long been established that higher doses of radiation delivered to the prostate results in higher rates of cure, but the amount of radiation that can be safely delivered is constrained by the method used to deliver the radiation. The biggest advantage of prostate brachytherapy is its ability to deliver extremely high doses of radiation within a small volume encompassing the prostate. Prostate brachytherapy does have some limitations, however. Specifically, as a minor surgical procedure, it is heavily operator dependent. It involves potentially hazardous materials, and, in the hands of an inexperienced practitioner, it can be quite dangerous and lead to significant iatrogenic (i.e., physician-caused) problems. As such, it is beneficial to develop efficient training processes to increase the skills of physicians to perform this procedure.

SUMMARY

In one aspect, a method of forming a prostate brachytherapy simulator is provided. In particular, the method comprises forming a rectum model. The rectum model may be formed between tubes secured to a base component of a container. The base component may have a first open-bottomed cup that opens to an exterior of the container and a second cup that contains the first open-bottomed cup. The method may also comprise forming a prostate model from recyclable materials. Additionally, the method may comprise placing the prostate model relative to the rectum model. The method may further comprise providing a gel-based environment that surrounds the rectum model and the prostate model within a container.

In another aspect, a method of performing a prostate brachytherapy simulation using a prostate brachytherapy simulator is provided. In particular, the method comprises inserting a needle through a gel-based environment into a prostate model comprising recyclable materials. In this embodiment, the prostate model is positioned in the gel-based environment relative to a rectum model. Additionally, the method comprises inserting a line of seeds into the prostate model via the needle. The method also comprises assessing the placement of the seeds utilizing a visualization tool. Further, the method comprises determining the accuracy of the placement of the seeds.

These and other features of the present invention will be described in more details below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a rectum model formed using the rectum forming components of FIG. 3, in accordance with embodiments of the present invention.

FIG. 5 illustrates a rectum model, in accordance with embodiments of the present invention.

FIG. 9A-9F illustrate a model prostate being fit with a urethra model component, in accordance with embodiments of the present invention.

DETAILED DESCRIPTION OF THE PREFERRED EMBODIMENTS

Figure 1:
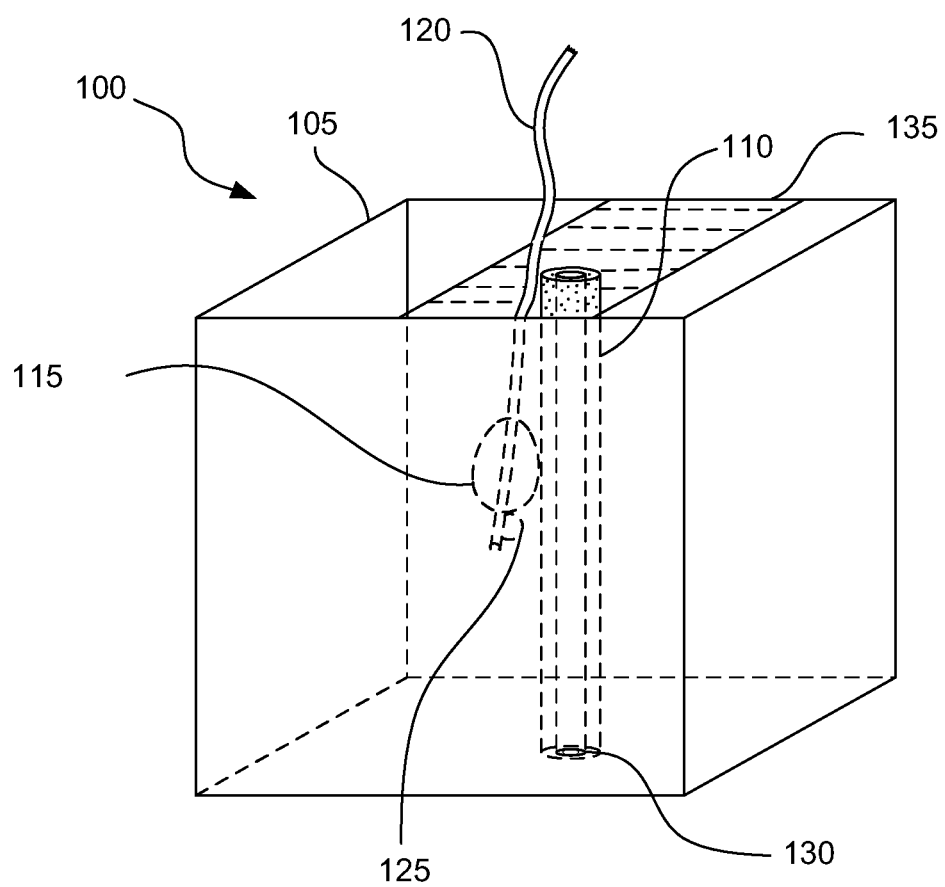
FIG. 1 illustrates a prostate brachytherapy simulator, in accordance with embodiments of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As prostate brachytherapy is a manual procedure requiring dexterous hand-eye coordination, a prostate brachytherapy simulator can provide a great benefit to both the field and to patients. In particular, a prostate brachytherapy simulator can help physicians learn and practice the procedure. Such a simulator can also be used to judge competency in the procedure and thus help patients by ensuring quality. Accordingly, embodiments in the disclosure provide a medical simulator for prostate brachytherapy. While the design of the models has been directed towards providing a realistic medical simulator to aid in the practice of prostate brachytherapy procedures, the models described herein may also be used as a medical phantom when they are static.

Materials that are needed to build a prostate brachytherapy simulator may be provided to a practitioner in a prostate brachytherapy simulator building kit. As such, a practitioner may take the materials in the prostate brachytherapy simulator building kit and build a simulator that may be used repeatedly. In particular, a prostate brachytherapy simulator building kit includes a mold for casting a simulated prostate out of gel, a mold for casting a simulated rectum out of gel, and an enclosure to encompass the simulated organs within a greater gel-based environment. Additionally, the simulator building kit may also include a Foley catheter that may be used to model the urethra.

The compositions of gels used in embodiments of the prostate brachytherapy simulator are such that the simulated organs are designed to be discernible from the surrounding gel-based environment (e.g., a simulated perineum) on both ultrasound and CT imaging. Additionally, the mechanical properties of the gels are such that they are conducive to simulating the prostate brachytherapy procedure during which many small metallic seeds are deposited in the prostate via needles under real-time ultrasound imaging guidance. Once the metallic seeds have been placed, CT-based imaging can be performed after the simulated procedure to analyze the placement of the seeds. Based on seed placement, the amount of simulated radiation delivered to the simulated structures may be calculated.

The methods employed and materials used are ideally relatively accessible such that personnel in the medical field will be able to build a simulator as described herein without difficulty or great expense. Additionally, the materials used are non-hazardous and partly recyclable for future simulations. In additional embodiments, the methods and apparatuses described may be used with an end-user's own formulation of gels suited for their own purposes (e.g., the end user may prefer to use gels optimized for MRI imaging instead of CT imaging).

Accordingly, FIG. 1 illustrates a prostate brachytherapy simulator 100, in accordance with embodiments of the present invention. The prostate brachytherapy simulator 100 comprises a container 105, a rectum model 110, a prostate model 115, a positioning device 120, a balloon 125, a container hole 130, and an artificial skin 135. In particular, the rectum model 110 is positioned within a base component (not shown) that is secured to the holding container 105. The base component (not shown) may be placed relative to container hole 130. Container hole 130 may be used to drain fluids, such as air and/or ultrasound gel, used in operating simulator 100. Further, a prostate model 115 is positioned relative to the rectum model 110. The prostate model 115 is placed relative to the rectum model 110 using a positioning device 120. The positioning device 120 may be a catheter. In particular, a catheter may be placed through the prostate model 115 and then used to position the prostate model 115 relative to the rectum model 110. Further, the positioning device 120 may also act as a urethra model by passing through the prostate model 115. In particular, a Foley catheter may be used as a positioning device 120 that also serves as a urethra model. The Foley catheter may pass through prostate model 115 after which balloon 125 of the Foley catheter may be inflated to hold prostate model 115 in place.

To represent an accurate representation, the prostate model 115 may be placed against the rectum model 110. Alternatively, the prostate model 115 may be placed slightly apart from the rectum model 110. Additionally, an artificial skin 135 may be placed across the top of simulator 100 so as to represent the resistance each needle passes through when entering the perineum.

Rectum model 110 and prostate model 115 may be molded from an agar-based gel. In particular, the agar-based gel may be formulated so as to minimize streaking in prostate model 115 when prostate model 115 is repeatedly inserted with needles. In particular, the streaking is formed when permanent track marks leave impressions on future ultrasounds. Further, the use of agar-based gels allows rectum model 110 and prostate model 115 to be recycled. The recyclable models allow practitioners to interact with the prostate brachytherapy simulator over and over again. In particular, practitioners may re-heat models to melt them and subsequently recast the liquefied gel in the appropriate casting mold to form a new model. Alternatively, practitioners may return used models to a materials supplier, where the models may be recycled and returned in a renewed form to the practitioner.

Alternatively, rectum model 110 and/or prostate model 115 may be molded from polyvinyl alcohol (PVA). In particular, PVA is more durable than an agar-based gel, making it a good choice for a rectum model 110 which, ideally, will not be pierced by a needle during use of the simulator 100. The use of PVA for the rectum model does not affect the ability of the prostate model 115 to be recycled.

While FIG. 1 illustrates a brachytherapy simulator 100, FIGS. 2-5 illustrate components used for forming a rectum model, such as rectum model 105 as seen in FIG. 1, and FIGS. 6-8 illustrate components used for forming a prostate model, such as prostate model 110 as seen in FIG. 1.

Figure 2A:
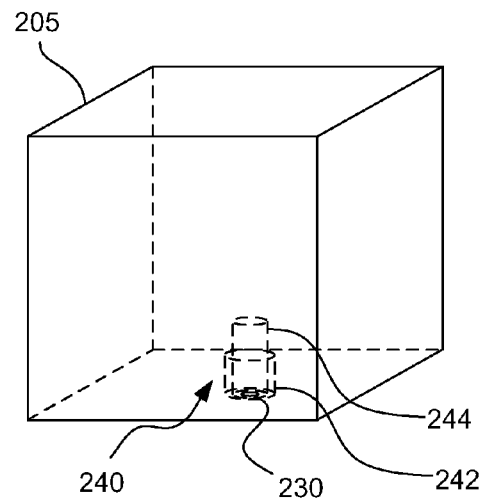
FIG. 2A illustrates a base rectum forming component within a container, in accordance with an embodiment of the present invention.

FIG. 2A illustrates a base rectum forming component within a container, in accordance with an embodiment of the present invention. In particular, FIG. 2A provides a container 205 having a container hole 230. Further, a base rectum forming component 240 is secured to the container 205. The base rectum forming component 240 is secured to the container 205 such that an outer ring 242 and an inner ring 244 are centered around the container hole 230. Base rectum component 240 is used to form a rectum model (not shown). In particular, base rectum component 240 is aligned with an inner rectum forming component and an outer rectum forming component.

Figure 2B:
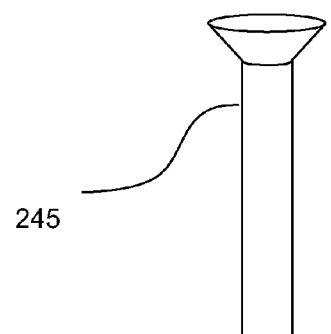
FIG. 2B illustrates an outer rectum forming component, in accordance with the embodiment of FIG. 2A.

Accordingly, FIG. 2B illustrates an outer rectum forming component 245, in accordance with the embodiment of FIG. 2A. In particular, outer rectum forming component 245 has a diameter based on a diameter of outer ring 242. In particular, outer rectum forming component 245 provides a measure of the width of the rectal wall within rectum model 110. When used in conjunction with an inner rectum forming component, outer rectum forming component 245 may form a three-dimensional tubal rectum model 110. For example, outer rectum forming component 245 may be connected to a first, outer collar of a base rectum forming component 240, such as that discussed in FIG. 2. Additionally, an inner rectum forming component may be connected to a second, inner collar of the base rectum forming component 240.

Figure 2C:
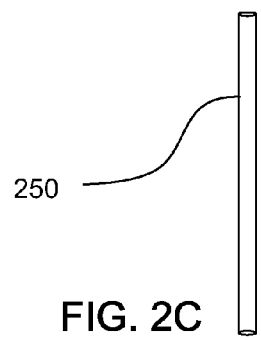
FIG. 2C illustrates an inner rectum forming component, in accordance with the embodiment of FIG. 2A.

Further, FIG. 2C illustrates an inner rectum forming component 250, in accordance with the embodiment of FIG. 2A. In particular, inner rectum forming component 250 has a diameter that based on a diameter of inner ring 244. Inner rectum forming component 250 may be a hollow tube or it may be a solid cylinder. By forming the inner void of the rectum model 110, inner rectum forming component 250 may remain within rectum model 110 or may be detached from rectum model 110. In particular, inner rectum forming component 250 may be removed to reveal a formation of a rectum wall within rectum model 110. The rectum wall may provide a difference in appearance observed by a training practitioner by medical imaging such as TRUS or CT. Additionally, in embodiments where a TRUS is used, the inner void may be filled with ultrasound contact gel that doesn't solidify. Alternatively, in embodiments where a CT scan is used, the inner void may be filled with air.

Further, embodiments where inner rectum forming component 250 is left within rectum model 105 may have a securing device 120 attached at a position above rectum model 105. In particular, securing device 120 may be attached at a position on the inner rectum forming component 250. In particular, an illustration of a securing device attached at a portion of an inner rectum forming component may be seen in FIG. 10.

Figure 3:
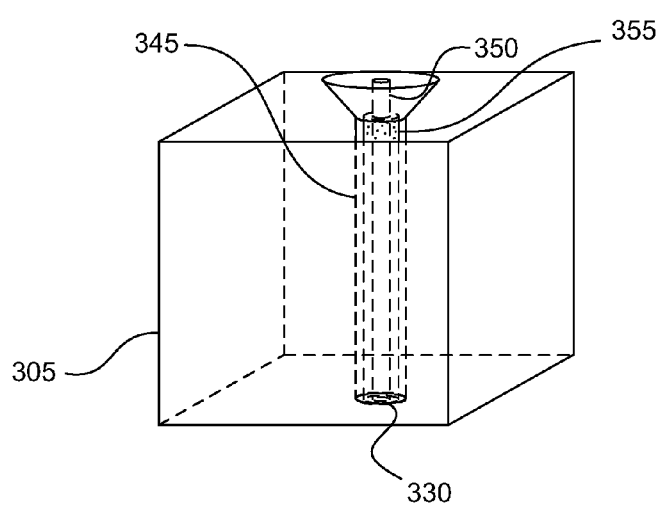
FIG. 3 illustrates rectum forming components aligned to form a rectum model, in accordance with embodiments of the present invention.

FIG. 3 illustrates a configuration of rectum forming components of the prostate brachytherapy simulator of FIGS. 2A-2C, in accordance with embodiments of the present invention. When FIGS. 2A-2C are in a configuration as shown in FIG. 3, a rectum model, such as rectum model 110 as seen in FIG. 1, may be formed. In particular, a rectum model may be formed by pouring liquidized gel poured between the outer and inner rectum forming components (345, 350, respectively).

A suitable gel used for the simulator's rectal wall may be prepared using an agar solution. In particular, an agar solution may be generated by dispersing enough agar powder to create a 7% by weight agar solution. For instance, to create 300 grams of 7% agar gel, 21 grams of agar powder may be combined with 279 grams of water. The mixture may be swirled so that all of the agar power has become wet. The mixture will appear cloudy at room temperature since the agar powder is not fully dissolved at room temperature. To dissolve the remaining agar powder into the water, the mixture may be heated until it is visibly boiling. This may be done over a flame or in a microwave. At the point that the mixture is visibly boiling, the agar should be fully dissolved and the mixture should appear to be a clear, molten gel. As the agar molten gel begins to cool, it will solidify into a solid gel. The agar molten gel should be poured into its desired container before the agar molten gel becomes a solidified agar gel.

The rectum forming components illustrated in FIGS. 2A-2C are arranged in the configuration shown in FIG. 3. In particular, FIG. 3 illustrates rectum forming components aligned to form a model rectum, in accordance with embodiments of the present invention. FIG. 3 comprises container 305, container hole 330, base rectum forming component (not shown), outer rectum forming component 345, inner rectum forming component 350, and molten gel 355. Accordingly, after a suitable molten gel for the rectal wall has been prepared, the molten gel is then poured between the outer and inner rectum forming components (345, 350, respectively) and allowed to solidify.

FIG. 4 illustrates a rectum model formed using the rectum forming components of FIG. 3, in accordance with embodiments of the present invention. As such, FIG. 4 comprises container 305, container hole 330, base rectum forming component (not shown), outer rectum forming component 345, inner rectum forming component 350, and rectum model 310. Once the gel between the outer and inner rectum forming components (345, 350, respectively) has solidified, the outer rectum forming component 345 may be removed by sliding it upwards, leaving behind the inner rectum forming component 350 which is now encircled by a tall, toroidal shape of solidified gel which will simulate the rectal wall. This is illustrated in FIG. 4, which illustrates the simulator's model rectum 310 after it has been poured and solidified and the outer rectum forming component 345 has been removed. The outer rectum forming component 345 is set aside and can be saved for future use. The inner rectum forming component 350, such as a thin cylindrical tube, may remain attached to the base rectum forming component (not shown) so as to be removed at a later step in the simulator's assembly.

FIG. 5 illustrates a rectum model, in accordance with embodiments of the present invention. In particular, FIG. 5 illustrates a rectum model 555 that surrounds inner forming component 550. In particular, the image of FIG. 5 illustrates a model rectum 555 that has been formed from gel poured between an outer rectum forming component 345 and inner rectum forming component 350, as described in FIG. 3.

Figure 6A:
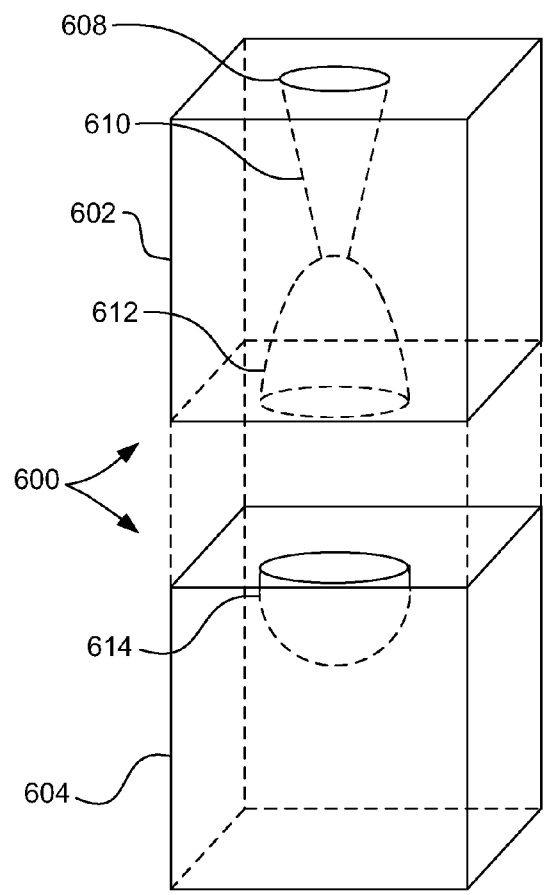
FIGS. 6A and 6B illustrate prostate forming components, in accordance with embodiments of the present invention.
Figure 6B:
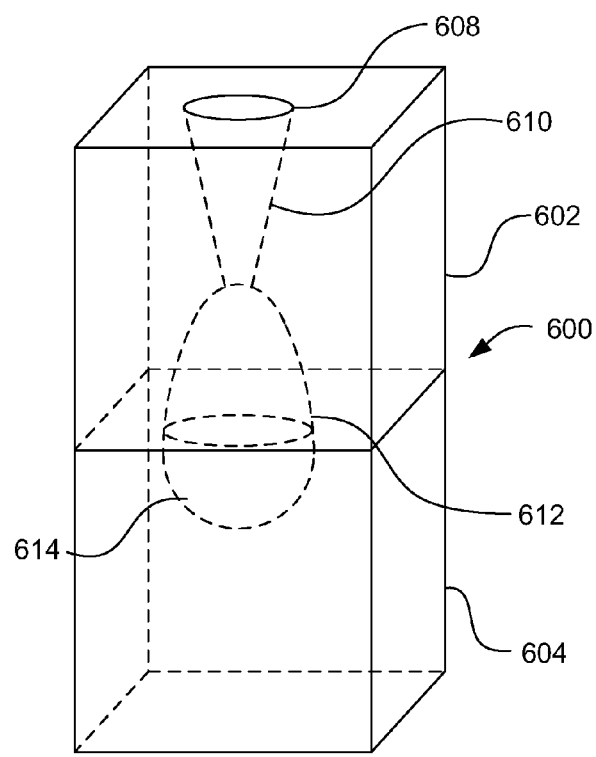
Figure 7:
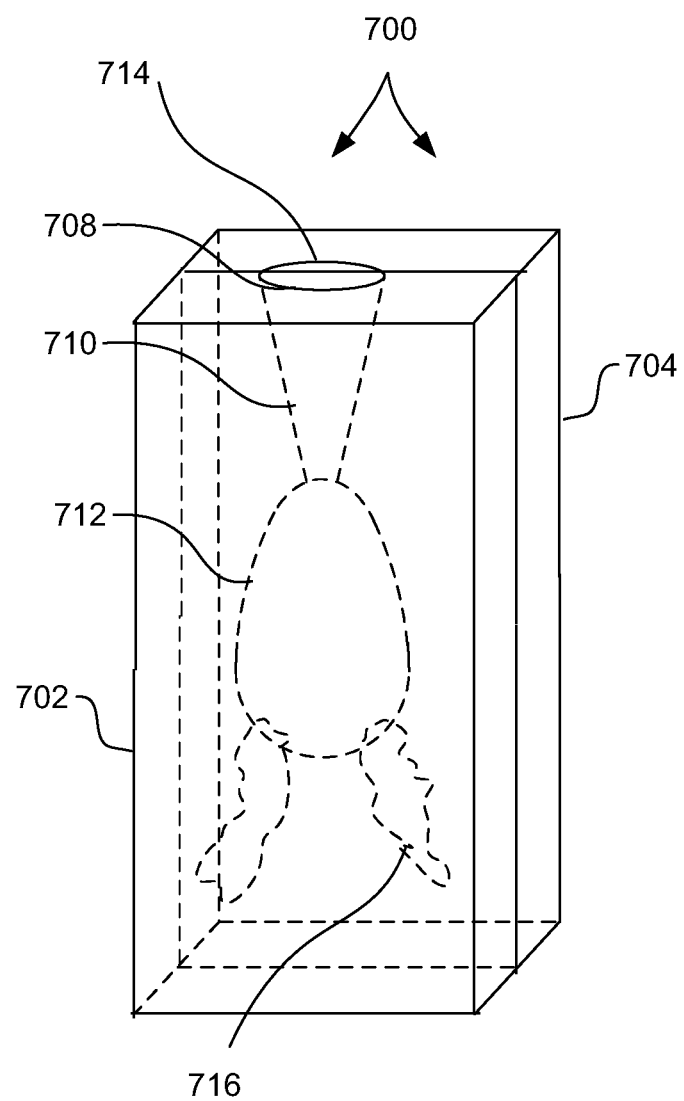
FIG. 7 illustrates prostate forming components having seminal vesicles, in accordance with embodiments of the present invention.
Figure 8:
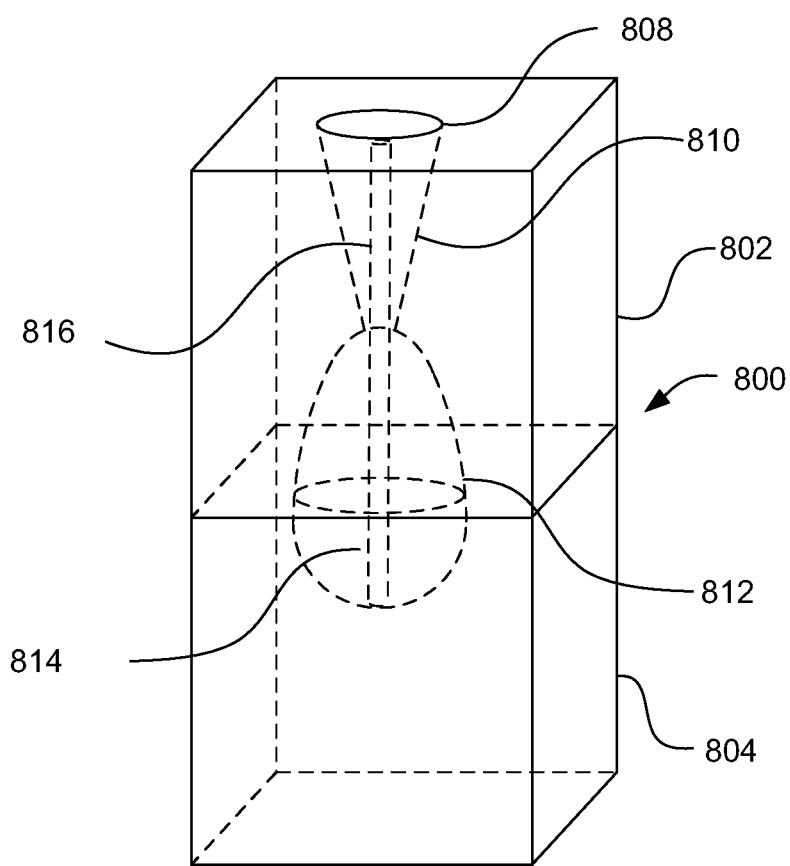
FIG. 8 illustrates prostate forming components having a urethra model component, in accordance with embodiments of the present invention.

FIGS. 6-8 illustrate prostate model forming components, in accordance with embodiments of the present invention. In particular, FIG. 6 provides molds that may be used to create prostate models. The molds of FIG. 6 allow for a liquefied gel to be placed within the mold, then cooled, then revealed to be in a solidified state. Prostate models may be formed of agar such that they may be re-liquefied and re-molded as recyclable materials. Further, the formulation of agar used may be optimized to minimize invasive streak marks when a needle passes through the prostate model to insert seeds.

Accordingly, FIGS. 6A and 6B illustrate prostate model forming components, in accordance with embodiments of the present invention. FIGS. 6A and 6B illustrate two configurations of a prostate shaped waterproof casting mold 600 that is made of two halves, an upper part 602 and a lower part 604. In particular, FIG. 6A shows the prostate mold when the two halves of the mold are separated and FIG. 6B shows when the two halves of the mold are put together. The two halves of the prostate mold 600 fit together with a water tight seam, the upper part 602 having a pour hole 608 on top which is connected by a funnel 610 that leads to a prostate shaped cavity, comprising an upper cavity portion 612 and a lower cavity portion 614, within the mold 600. After the two halves of the mold 600 are joined as in FIG. 6B, a suitable molten gel is poured through the pour hole on the superior aspect of the mold to cast the simulator's prostate.

A suitable gel used for the simulator's prostate model may be prepared using an agar solution. In particular, an agar solution may be generated by dispersing enough agar powder and enough glycerol to create a 2% by weight agar solution and 40% by weight glycerol solution, respectively. For example, to create 100 grams of this gel, combine 2 grams of agar powder and 40 grams of glycerol with 58 grams of water in a glass container. Swirl the mixture so that all of the agar powder has become wet (e.g., no dry powder is visible). The mixture will appear cloudy at this point since the agar powder is not fully dissolved. Next, heat the mixture until it is visibly boiling. This may be done over a flame or in a microwave. At this point the agar has dissolved and the mixture is now a clear, viscous molten gel. As it cools to room temperature, it will solidify into a solid gel. The molten gel should be poured into its mold before it solidifies. The resulting prostate models created resemble molds used to create them, such as molds seen in FIGS. 6A and 6B.

Further, FIG. 7 illustrates prostate model forming components having seminal vesicles, in accordance with embodiments of the present invention. FIG. 7 illustrates a configuration of a prostate-shaped waterproof casting mold 700 that is made of two halves, a front part 702 and a back part 704. In particular, FIG. 7 shows the prostate mold when the two halves of the mold are put together. The two halves of the prostate mold 700 fit together with a water tight seam, the front part 702 having a pour hole 708 on top which is connected by a funnel 710 that leads to a prostate shaped cavity, comprising a front cavity portion 712 and a back cavity portion 714, within the mold 700. Further, at least one of front cavity portion 712 and back cavity portion 714 has at least one seminal vesicle cavity 716. After the two halves of the mold 700 are joined as in FIG. 7, a suitable molten gel is poured through the pour hole on the superior aspect of the mold to cast the simulator's prostate model.

Additionally, FIG. 8 illustrates prostate forming components having a urethra model component, in accordance with embodiments of the present invention. FIG. 8 illustrates a configuration of a prostate-shaped waterproof casting mold 800 that is made of two halves, an upper part 802 and a lower part 804. In particular, FIG. 8 shows the prostate mold when the two halves of the mold are put together. The two halves of the prostate mold 800 fit together with a water tight seam, the upper part 802 having a pour hole 808 on top which is connected by a funnel 810 that leads to a prostate shaped cavity, comprising an upper cavity portion 812 and a lower cavity portion 814, within the mold 800. Further, a displacement tube 816 is placed through cavities 812 and 814 so as to allow for a passage to pass through the prostate model that is formed from gel. After the two halves of the mold 800 are joined as in FIG. 8, a suitable molten gel is poured through the pour hole on the superior aspect of the mold to cast the simulator's prostate model. The suitable molten gel fills up cavities 812 and 814 except for a portion displaced due to displacement tube 816. As such, when the molten gel is solidified, the resulting prostate model has a passage through which a catheter may be passed.

While a prostate model forming component may be made solely of gel-based components, a urethra model may also be placed within a prostate model forming component so as to have the urethra model become a part of the formed prostate model. This is illustrated in FIG. 9, which illustrates formation of a prostate model forming component having a urethra model, in accordance with embodiments of the present invention. In particular, after gel is poured and solidified in a casting mold, the mold is separated into its two halves, liberating the simulator's prostate model 900, as shown in FIG. 9A. If too much gel was poured into the mold in excess of the capacity of the mold's prostate cavity, the excel gel would start to fill the funnel-shaped pouring hole; this excess gel can be easily trimmed off the simulator's gel prostate after it solidifies. The prostate mold is set aside and can be saved for future use.

FIGS. 9A-9C show how to core out a simulated urethral track in the simulator's prostate model 900 using a coring device 902. A plastic drinking straw or other such thin-walled and thin caliber tube can be used as a coring device 902. In particular, a coring device 902 may be inserted into the apex 904 of the simulator's prostate model 900 and pushed through the entire length of the simulated prostate model 900 until it passes through the base 906 of the simulator's prostate, as shown in FIG. 9B. The coring device 902 may then be entirely withdrawn as shown in FIG. 9C, taking with it a cylindrical core of gel 908 from the simulated prostate model 900 and leaving behind the simulated prostate with a tunnel 910 simulating a urethra. The straw, or other coring device 902, is set aside and may be saved for future use.

Further, FIGS. 9D-9F illustrate placement of a Foley catheter 912 through tunnel 910. In particular, a Foley catheter 912 may be passed through tunnel 910 of the simulator's prostate model 900 from the apical end 904. After the Foley tip exits from the base 906 as shown in FIG. 9E, the Foley balloon 914 is then inflated with water thereby securing the Foley catheter 912 within the simulated prostate model 900 as shown in FIG. 9F. The Foley catheter 912 itself now simulates a urethra model as it traverses through tunnel 910 of simulated prostate model 900.

Figure 10:
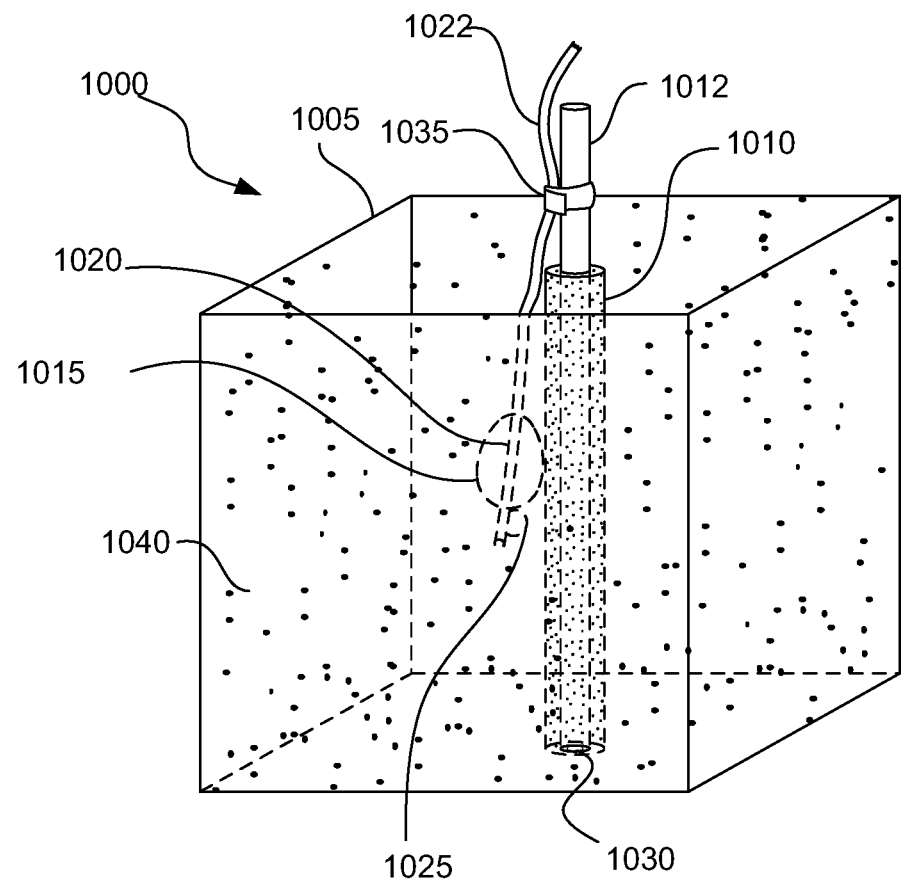
FIG. 10 illustrates an upright prostate brachytherapy simulator, in accordance with embodiments of the present invention.

Once a rectum model and a prostate model are formed, the prostate model may be placed relative to the rectum model in a prostate brachytherapy simulator. FIG. 10 illustrates a prostate brachytherapy simulator 1000, in accordance with embodiments of the present invention. In particular, FIG. 10 comprises prostate brachytherapy simulator 1000, container 1005, rectum model 1010, inner rectum forming component 1012, prostate model 1015, urethra model 1020, upper portion of urethra model 1022, balloon 1025, container hole 1030, securing device 1035, and gel-based environment 1040.

Prostate brachytherapy simulator 1000 may be housed in a container 1005. Prostate model 1015 may be placed relative to rectum model 1010 in container 1005. Further, prostate model 1015 and rectum model 1010 may be surrounded by a gel-based environment 1040 within the container 1005. The gel-based environment 1040 may simulate the perineum. In particular, once the prostate model 1015 has been positioned relative to the rectum model 1010, the molten gel is used to fill up remaining space within the container. Accordingly, rectum model 1010 and prostate model 1015 should be composed of materials that are able to withstand the temperature of the molten material used for creating gel-based environment 1040. In embodiments, gel-based environment 1040 may consist of a water-based gel doped with barium sulfate that is distinguishable from rectum model 1010 and prostate model 1015 when viewed on a medical visualization device. Alternative examples of a gel-based environment may include a water-based gel having zinc oxide impurities; a protein-based gel; and a gel that is enhanced using glass microbeads.

For example, a suitable gel used for the simulator's perineum may be prepared using an agar solution. In particular, an agar solution may be generated by dispersing enough agar powder and enough barium sulfate powder to create a 1% by weight agar and 0.5% by weight barium sulfate solution, respectively. For example, to make 1.8 kg of this mixture, mix 18 grams of agar powder, 450 grams of 2% barium sulfate, and 1.332 kg of water in a large container and bring to a boil; a metal pot may be used to heat the mixture on any stove top or over a flame, or a glass or plastic container may be used to heat the mixture in a microwave. Next, allow the molten gel mixture to cool to about 50-60 degrees Celsius before adding it to the simulator's container. If the gel mixture solidifies before being used (which happens if it cools to 30-40 degrees Celsius), it can simply be melted by reheating it to 80-90 degrees Celsius.

As such, gel-based environment 1040 is of a distinguishable density when compared to rectum model 1010 and prostate model 1015. This distinction between gel densities aids in the visualization of prostate model 1015 in a simulated prostate brachytherapy procedure. By adding distinguishing densities in a prostate brachytherapy simulator, users can experience a simulated medical procedure using a visualization device, such a TURS. Accordingly, embodiments of prostate brachytherapy simulators as discussed herein may be compatible with multiple medical visualization modalities. For example, embodiments of the prostate brachytherapy simulator may be compatible with CT-imaging, ultrasound imaging, as well as magnetic resonance imaging.

Additionally, the gel-based materials utilized for the rectum model 1010, prostate model 1015, and gel-based environment 1040 may be recyclable. In particular, the gel-based materials may have hysteretic properties that allow the gels to transfer between a liquid state and a semi-solid state when the gels are heated and cooled, respectively. This heating and cooling may be repeated a significant number of times (e.g., twenty times) while maintaining the mechanical and visual properties of the gel itself. As such, practitioners wishing to train on a prostate brachytherapy simulator may recycle the simulator by melting and recasting the gels used in rectum models 1010, prostate models 1015, and gel-based environment 1040.

Accordingly, FIG. 10 illustrates a final assembly of the simulator from its components. In particular, prostate model 1015 is positioned next to rectum model 1010 in the correct orientation with the apical end pointing up while simultaneously observing the correct anterior and posterior orientations. Additionally, prostate model 1015 is suspended by a Foley catheter by affixing the Foley catheter to the thin cylindrical tube, which can be done with a piece of adhesive tape or by other means. In this example, the Foley catheter also acts as a urethra model 1020. Prostate model 1010 is prevented from sliding off the Foley catheter by the inflated Foley catheter balloon 1025. After prostate model 1015 is thus positioned, the molten perineal gel that comprises gel-based environment 1040 is poured into the space of the encompassing container 1005 through its open top, filling container 1005 up to its limit, thereby surrounding and embedding the prostate model 1015 and rectal model 1010 within gel-based environment 1040. In particular, gel-based environment 1040 simulates the perineum. Further, the molten perineal gel should not have a temperature above the melting points of the gels used for rectum model 1010 and prostate model 1015 when it is poured into container 1005.

Figure 11:
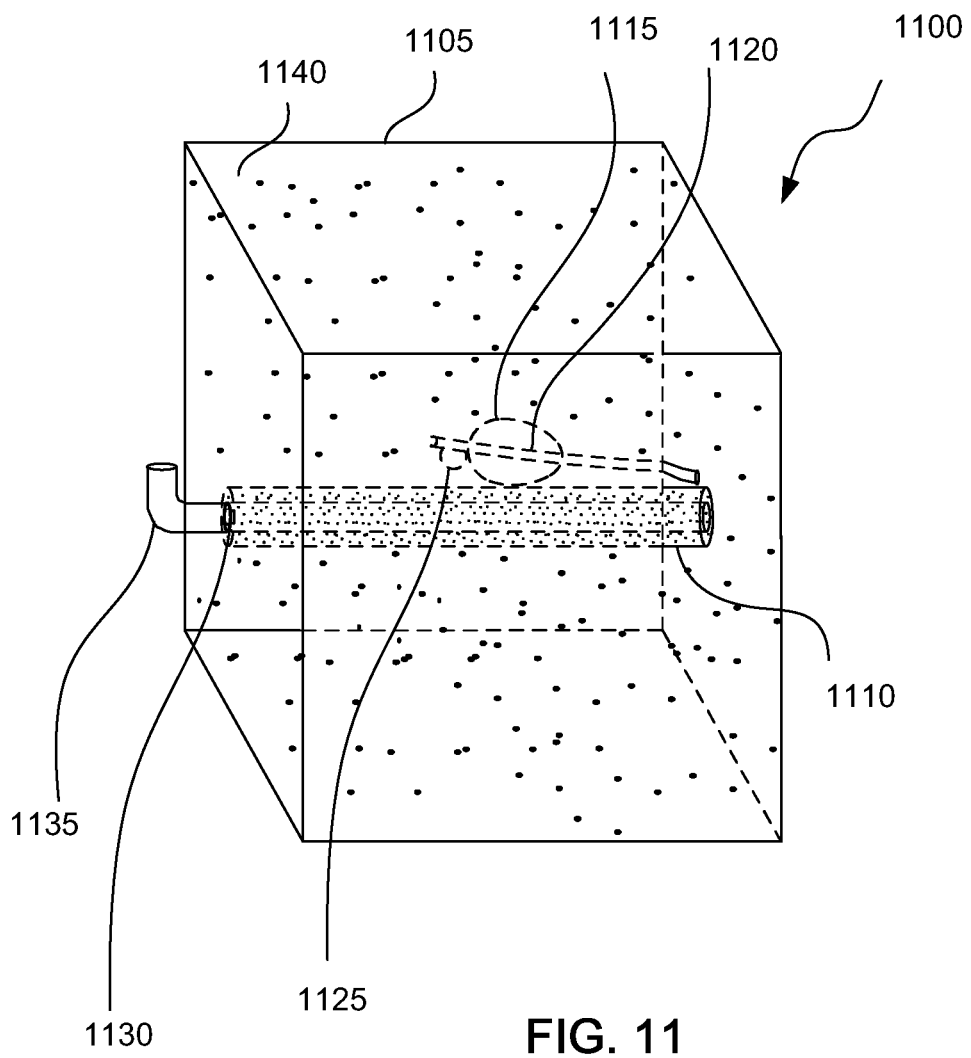
FIG. 11 illustrates a prostate brachytherapy simulator that is positioned for use, in accordance with embodiments of the present invention.

While FIG. 10 illustrates a final assembly of a prostate brachytherapy simulator, FIG. 11 illustrates a prostate brachytherapy simulator that is positioned for use. In particular, FIG. 11 comprises prostate brachytherapy simulator 1100, container 1105, rectum model 1110, prostate model 1115, urethra model 1120, balloon 1125, container hole 1130, ultrasound gel reclamation tube 1135, and gel-based environment 1140. Accordingly, after the perineal gel that comprises gel-based environment 1140 has solidified, the Foley catheter is separated from the inner rectum forming component 1012 of FIG. 10 by removing the tape (or other means of fixation). The next step is to remove inner rectum forming component, as seen in FIG. 11. The inner rectum forming component is carefully withdrawn from the assembled simulator by gently pulling upward on the tube and applying a twisting motion if necessary, leaving behind the hollow cylindrical rim of gel comprising rectum model 1110 embedded within gel-based environment 1140. The hollow space surrounded by the inner wall of rectum model 1110 represents the simulator's rectal lumen. The inner rectum forming component is set aside and saved for future use. Note, the newly created simulated rectal space extends to the base of simulator 1100 and communicates to the outside through the small hole in the simulator's base, referred to herein as container hole 1130. Container hole 1130 allows the free passage of air or ultrasound contact gel between the simulator's rectal space and the outside. If rectum model 1110 extends beyond the surface of the rest of simulator 1100, it may be trimmed so that it is flush with rest of the simulator face.

Once prostate brachytherapy simulator 1100 has been constructed, additional steps may be taken to increase the stability of prostate brachytherapy simulator 1100. For example, container 1105 that houses gel-based environment 1140 that surrounds prostate model 1115 and rectum model 1110 may have stabilizers. For instance, container 1105 may include legs on the bottom of container 1105 to focus its weight distribution at the corners of container 1105. Additionally and/or alternatively, container 1105 may have lateral stabilizers, such as cross-braces. For example, binders (such as tape) may be placed diagonally across the lateral portion of prostate brachytherapy simulator 1100 so as to hold the simulator in place while a simulation is being performed.

Accordingly, once gel-based environment 1140 solidifies around prostate model 1115 and rectum model 1110, a user may insert an ultrasound probe, such as the TRUS, to image the resulting anatomy. In particular, the TRUS may be placed in the opening created by removing the inner rectum forming component from rectum model 1110. Additionally, ultrasound gel may be used to increase the contact between the TRUS and the inner wall of rectum model 1110. If the ultrasound gel is displaced by the TRUS, it may be collected by ultrasound gel reclamation tube 1135.

Using visualization from the ultrasound probe, the training practitioner may pass needles through gel-based environment 1140 and into prostate model 1115. Inserting the needles to the farthest point within prostate model 1115 that is on the trajectory of the treatment, the training practitioner may insert a seed (not shown). Then, retreating centimeter by centimeter along its original path, the practitioner may continue to implant seeds until all treatment seeds along the path of the needle have been placed. The training practitioner may repeat these steps for each needle path that is provided to prostate model 1115.

Once the seeds have been placed, the implanted prostate model 1115 may be assessed using another visualization process, such as a CT-scan. The resulting visualization may be assessed for accuracy of seed placement. In particular, the assessment may determine whether all of the seeds were placed within the model prostate, and how accurately the model seeds were placed within the prostate. This assessment allows the training practitioner to become aware if they have erroneously placed a seed within, for example, rectum model 1110. When erroneously placed in real-life, radioactive seeds placed within the patient's rectum may result in fistulas.

Additionally, displacement of air or ultrasound gel to the outside of container 1105 may be directed in a stabilized manner. For example, the ultrasound gel that is used to increase contact between the TRUS and the inner wall of rectum mode 1110 within a container of a constructed prostate brachytherapy simulator may be displaced when the TRUS is moved within simulator 1100. As such, an exit tube may be placed outside container hole 1130 of the simulator. For instance, ultrasound gel reclamation tube 1135 may be placed next to container hole 1130 such that ultrasound gel reclamation tube 1135 is able to receive excess ultrasound gel that is displaced by the TRUS. Further, ultrasound gel reclamation tube 1135 may include a curved end that is able to curve up, allowing excess ultrasound gel to sit within the curved cup of the curved end of ultrasound gel reclamation tube 1135 while simulator 1100 is in use.

After simulator 1100 has been assembled as above, it is ready for use. The simulator is placed on the treatment table, or other surface serving as a treatment platform, such that the simulator base with the small hole represents the cephalic end of the simulator, the rectal opening and exit of the Foley catheter represent the caudal end of simulator 1100, and the simulated prostate lies anterior to (e.g., above) the simulated rectum. This orientation of simulator 1100 corresponds to a patient lying supine on a table. Simulator 1100 may be fixed to the treatment table with tape in a cross-bracing fashion or other method. In alternative embodiments, Velcro may be used to affix simulator 1100 to the treatment platform.

Once simulator 1100 is secured to the treatment platform, a user may proceed with the prostate brachytherapy simulation. Ultrasound gel is applied to the transrectal ultrasound probe, and preferably an ultrasound probe balloon cover is used with the probe to enhance visualization. As the ultrasound probe is inserted in the rectal lumen, the air in the rectal space is allowed to exit through the small container hole 1130 in the base of container 1105. Conversely, when the probe is withdrawn from the simulator, air may flow from the outside into the rectal lumen through the hole in the simulators base.

Once prostate model 1115 is visualized, the brachytherapy needles can be inserted through the gel-based environment 1140 and into prostate model 1110. Non-radioactive 'dummy' seeds may then be inserted through the needles into the simulated prostate under ultrasound guidance using the brachytherapy seed applicator, taking care not to place the seeds close to or in the rectum model 1110 or urethra model 1120. Simulator 1100 is compatible with both the 'real-time' planning method and the 'pre-planned' method of seed implantation. After the prescribed number of seeds has been placed, the needles are withdrawn and the implanted seeds may be visualized with x-ray fluoroscopy. The implanted simulator 1100 may also undergo a CT scan so that the implanted seeds can be mapped with respect to implanted prostate model 1115, urethra model 1120, and rectum model 1110, thereby permitting the calculation of the simulated doses of radiation delivered to the simulated organs and allowing the performance of other standard dosimetric analyses.

After performing radiographic documentation of the simulated implant for dosimetric analyses, the implanted simulator 1100 can be disassembled and partially recycled for future use. First, all gel components may be removed from the enclosing container 1105. Additionally, the enclosing container should be washed and dried, and then may be set aside for future use. The gel components may also be re-melted and reformed for future use as well. To recycle the seeds, the simulated prostate is melted and the seeds will sink to the bottom of the molten gel; the seeds may then be collected, washed and then dried, and then set aside for future use. The Foley catheter may be removed and saved for future use as well.

Figure 12:
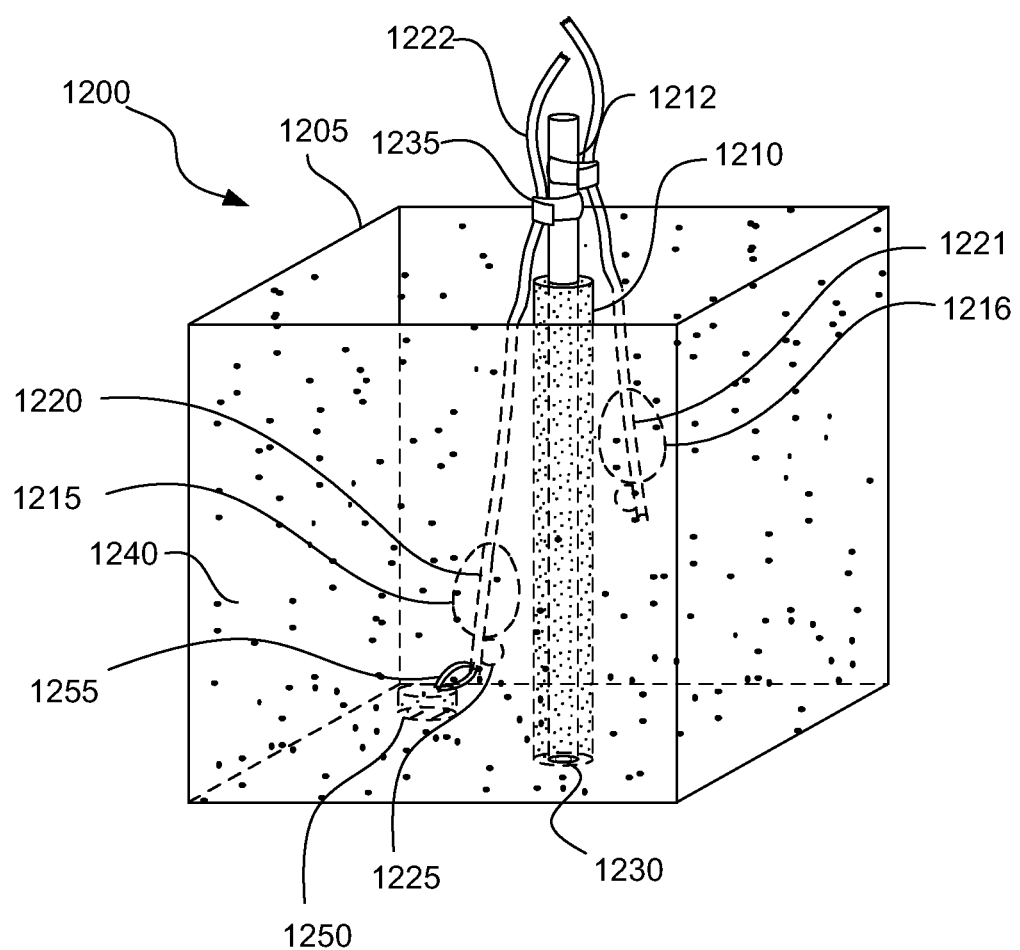
FIG. 12 illustrates a multi-model prostate brachytherapy simulator with a tail hook, in accordance with embodiments of the present invention.

While FIG. 11 illustrates a prostate brachytherapy simulator, it only illustrates one prostate model to assess. However, given the circular nature of a rectum model, further simulators may include multiple model prostates that may be used and assessed within one simulator. As such, FIG. 12 illustrates a multi-model prostate brachytherapy simulator with a tail hook, in accordance with embodiments of the present invention. In particular, FIG. 12 comprises simulator 1200, container 1205, rectum model 1210, first prostate model 1215, second prostate model 1216, first urethra model 1220, second urethra model 1221, balloon 1225, container hole 1230, securing device 1235, gel-based environment 1240, tail hook base component 1250, and tail hook 1255. Accordingly, simulator 1200 as provided in FIG. 12 is able to be used for two simulations—in particular, a training practitioner may use first prostate model 1215 for a first simulation when container 1205 is oriented to have first prostate model 1215 oriented above rectum model 1210. Additionally, the training practitioner may use second prostate model 1216 for a second simulation when container 1205 is oriented to have second prostate model 1216 oriented above rectum model 1210. The gel reclamation tube 1135 may be rotated such that the curved end of the tube can point up. As such, the reclamation tube can be reconfigured to collect displaced gel for each simulation performed on a multi-prostate model simulator. By allowing a training practitioner to have multiple models of a prostate brachytherapy simulator, efficiencies are created.

In alternative embodiments, a multi-model prostate brachytherapy simulator within a rectangular container, such as the simulator 1200 in FIG. 12, may have four prostate models. In particular, a multi-model prostate brachytherapy simulator may have one prostate model oriented to each side of a four-sided container. Similarly, an alternative multi-model prostate brachytherapy simulator within a hexagonal container may have six prostate models. In particular, a multi-model prostate brachytherapy simulator may have one prostate model oriented to each side of a six-sided container.

Additionally, FIG. 12 also discloses the use of a tail hook 1255 to help position a Foley catheter that acts as a urethra model. In particular, a Foley catheter that is used as first urethra model 1220 secured in place using a tail hook 1250 that is secured to a tail hook base component 1250 that is attached to container 1205. Tail hook 1250 comprises a ring that is secured to base component 1250. In alternative embodiments, tail hook 1250 may comprise a hook that is secured to base component 1250. The tail hook 1255 passes through an eyelet that is present on the tip of the Foley catheter. Without the use of a tail hook 1255, first prostate model 1215 may be knocked out of place before a gel-based environment 1240 has solidified. As such, the use of a tail hook 1255 prevents the displacement of first prostate model 1215 that is positioned via a urethra model 1220.

Figure 13:
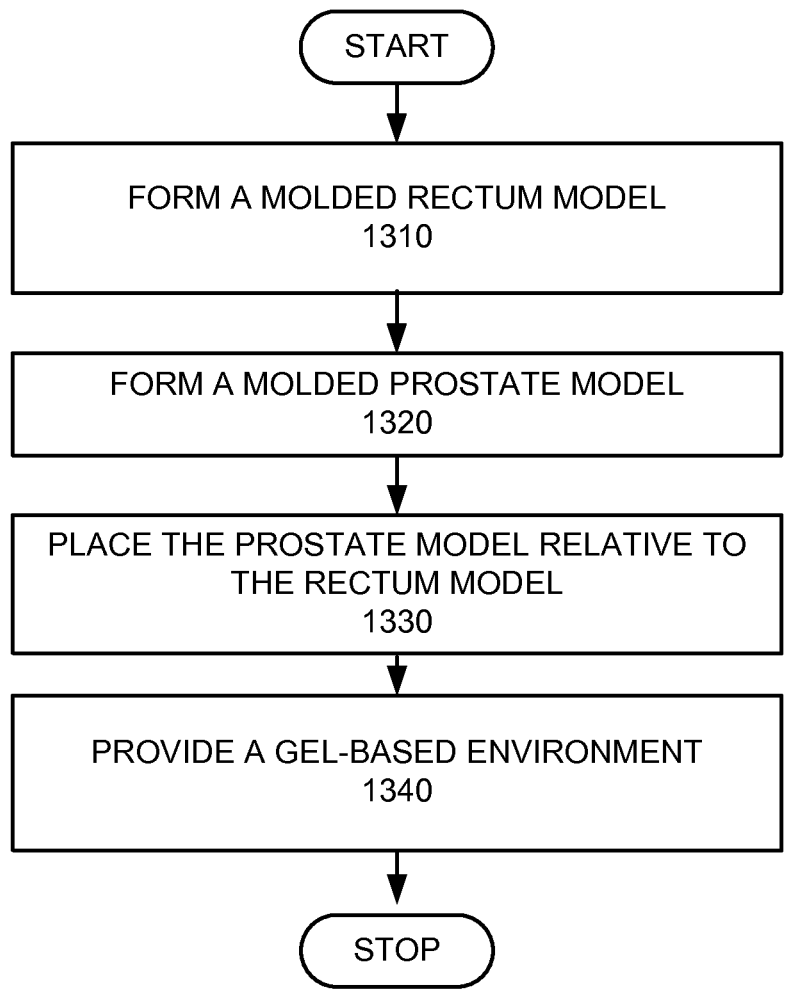
FIG. 13 illustrates a flowchart of a method of forming a prostate brachytherapy simulator, in accordance with embodiments of the present invention.

FIG. 13 illustrates a flowchart 1300 of a method of forming a prostate brachytherapy simulator, in accordance with embodiments of the present invention. At block 1310, a rectum model is formed. In particular, a rectum model is molded between tubes secured to a base component of a container. The base component has a first open-bottomed cup that opens to an exterior of the container. At block 1320, a prostate model is formed. In particular, the prostate model is molded from recyclable materials. At block 1330, the prostate model is placed relative to the rectum model. At block 1340, a gel-based environment is provided. In particular, the gel-based environment surrounds the rectum model and the prostate model within a container. Further, the gel-based environment may be recyclable.

Figure 14:
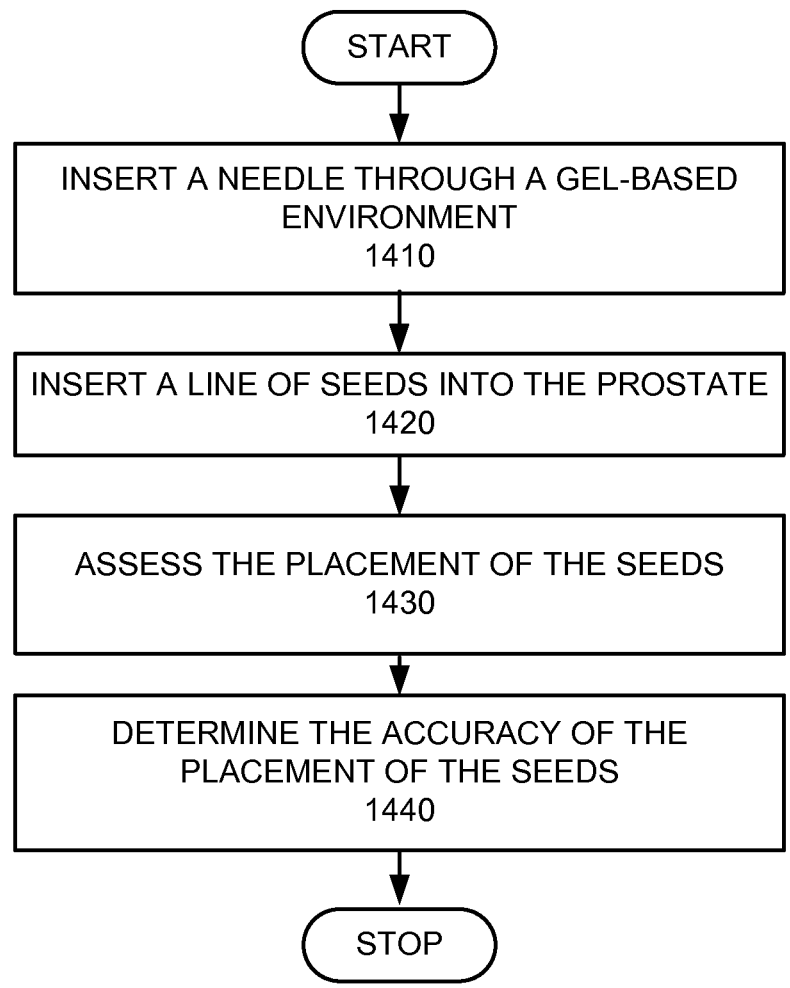
FIG. 14 illustrates a flowchart of a method of performing a prostate brachytherapy simulation using a prostate brachytherapy simulator, in accordance with embodiments of the present invention.

Once a prostate brachytherapy simulator has been built, practitioners may interact with the simulator to improve their skills in performing brachytherapy procedures. Accordingly, FIG. 14 illustrates a flowchart of a method of performing a prostate brachytherapy simulation using a prostate brachytherapy simulator, in accordance with embodiments of the present invention. At block 1410, a needle is inserted through a gel-based environment. In particular, the needle is inserted through the gel-based environment into a prostate model comprising recyclable materials. The prostate model is positioned in the gel-based environment relative to a rectum model. At block 1420, a line of seeds is inserted into the prostate. In particular, the line of seeds is inserted into the prostate via a needle. At block 1430, the placement of seeds is assessed. In particular, the placement of the seeds is assessed utilizing a visualization tool. At 1440, the accuracy of the placement of the seeds is determined.

Figure 15:
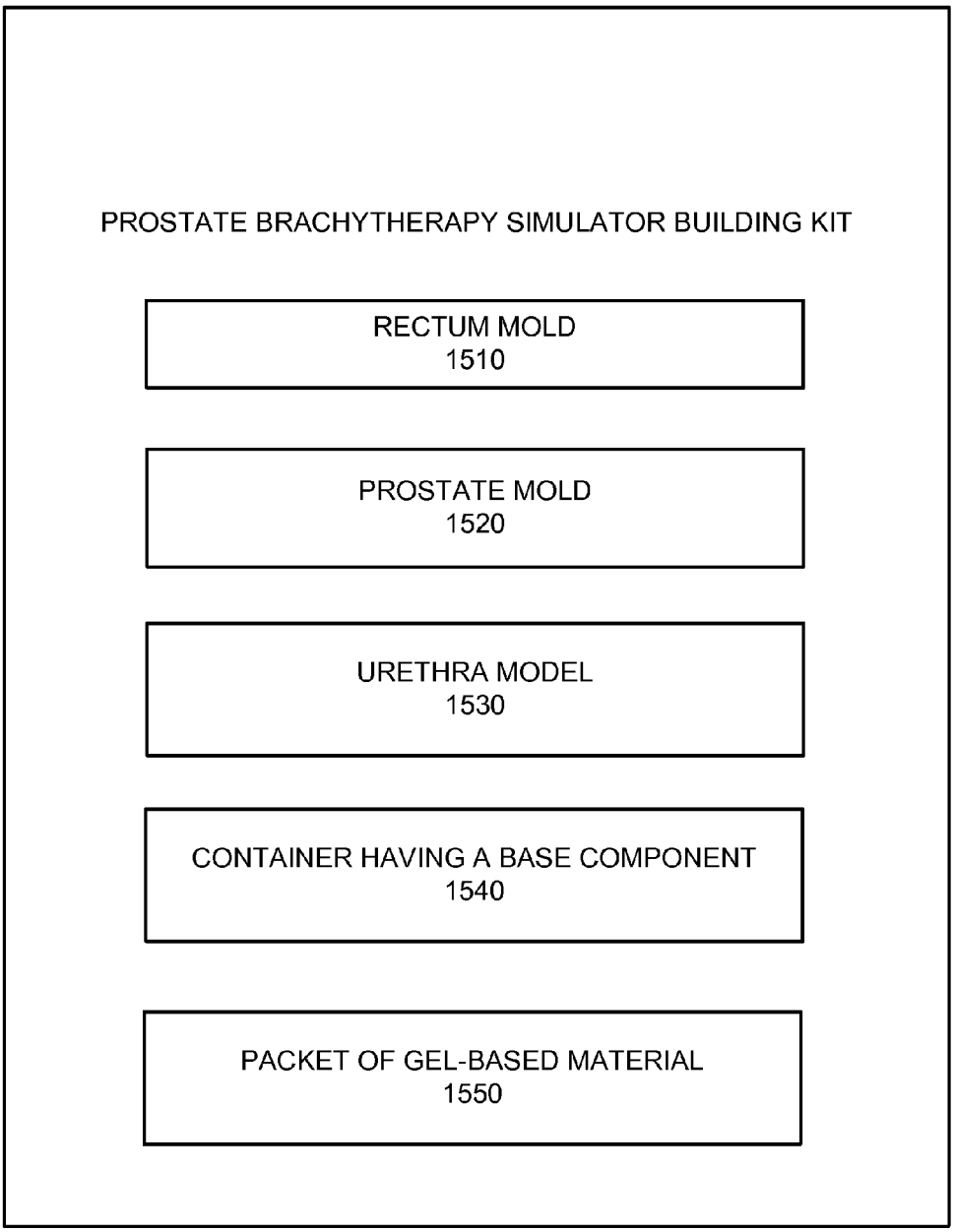
FIG. 15 illustrates a prostate brachytherapy simulator building kit, in accordance with embodiments of the present invention.

The materials that are used in building a prostate brachytherapy simulator may be provided to a practitioner in a kit. In particular, the practitioner may order a prostate brachytherapy simulator building kit that the practitioner may use to build a prostate brachytherapy simulator. As such, FIG. 15 illustrates a prostate brachytherapy simulator building kit, in accordance with embodiments of the present invention. In particular, the prostate brachytherapy simulator building kit comprises rectum mold 1510, prostate mold 1520, urethra model 1530, container having a base component 1540, and at least one packet of gel-based material 1550. In particular, rectum mold 1510 may be used to form a rectum model. Additionally, prostate mold may be used to form a prostate model. The prostate model formed from prostate mold 1520 may or may not incorporate a placement for urethra model 1530. Further, a container having a base component 1540 may be used to position components of the simulator. Further, the at least one packet of gel-based material 1550 is expandable to surround a rectum model and a prostate model within the container. The kit may also include gel-based material for each component of the prostate brachytherapy simulator model. In particular, the prostate model may be formed from a gel that differs in density from the surrounding gel-based environment. In another embodiment, the density of the prostate model may differ from the density of the rectum model which may differ from the density of the surrounding gel-based environment.

While this invention has been described in terms of several embodiments, there are alterations, permutations, modifications, and various substitute equivalents, which fall within the scope of this invention. In particular, while a specific formulation of agar-based gel has been provided for each component of a prostate brachytherapy simulator, alternative formulations may also be used. For example, alternative formulations that also minimize streaking within a prostate model may also be used. Additionally, it should be noted that there are many alternative ways of implementing the methods and apparatuses of the present invention. It is therefore intended that the following appended claims may be interpreted as including any combination of such alterations, permutations, and various substitute equivalents as fall within the disclosure of the present invention.

What is claimed is:

1. A method of forming a prostate brachytherapy simulator, the method comprising:
  forming a rectum model between tubes secured to a base component of a container, the base component having a first open-bottomed cup that opens to an exterior of the container and a second cup that contains the first open-bottomed cup;
  forming a prostate model from recyclable materials;
  placing the prostate model relative to the rectum model;
  providing a gel-based environment that surrounds the rectum model and the prostate model within a container.

2. The method of claim 1, wherein the rectum model is positioned within the base component used to form the rectum model.

3. The method of claim 1, wherein the rectum model is curved.

4. The method of claim 1, wherein the prostate model is formed from an agar gel.

5. The method of claim 1, wherein the prostate model is formed from recyclable materials.

6. The method of claim 1, wherein the prostate model is formed from non-toxic materials.

7. The method of claim 1, wherein the prostate model is formed from a configuration of an agar gel that is designed to minimize streaking.

8. The method of claim 1, wherein the prostate model is dipped into latex to create a prostate capsule.

9. The method of claim 1, further comprising:
  creating a tube through the prostate model using a coring device; and
  placing a urethra model through the tube in the prostate model.

10. The method of claim 9, wherein the urethra model is a catheter.

11. The method of claim 1, further comprising:
placing a layer of artificial skin across a portion of the gel-based environment.

12. The method of claim 11, wherein the artificial skin is shaped based on a container that holds the gel-based environment that surrounds the rectum model and the prostate model.

13. A prostate brachytherapy simulator, the prostate brachytherapy simulator comprising:
a rectum model;
a prostate model;
a urethra model that passes through the prostate model;
a gel-based environment that surrounds the rectum model and the prostate model within a container, wherein the prostate model is formed from a gel that differs in density from the surrounding gel-based environment; and
a tail hook.

14. The method of claim 13, wherein the density of the prostate model differs from the density of the rectum model which differs from the density of the surrounding gel-based environment.

15. The method of claim 13, wherein the urethra model is used to position the prostate model relative to the rectum model.

16. The simulator of claim 13, wherein the prostate model is formed from protein-based gel.

* * * * *